United States Patent
Bright, Sr.

[11] Patent Number: 6,033,744
[45] Date of Patent: Mar. 7, 2000

[54] ARTIFICIAL BOULDER

[76] Inventor: William J. Bright, Sr., 456 Pheasant La., Fairless Hills, Pa. 19030

[21] Appl. No.: 09/090,179
[22] Filed: Jun. 4, 1998
[51] Int. Cl.[7] ...................................................... B44F 9/04
[52] U.S. Cl. ...................................... 428/15; 428/99; 52/4
[58] Field of Search .................................. 52/4; 428/15, 99

[56] References Cited

U.S. PATENT DOCUMENTS 4,197,684  4/1980  Johnson ..................................... 428/15
4,758,934  7/1988  Koborn ..................................... 428/15

Primary Examiner—Alexander Thomas

[57] ABSTRACT

A new artificial boulder for easy placement and easy portability. The inventive device includes a shell having a top portion, a bottom portion, an exterior surface, an inner surface. The exterior surface of the shell is designed formed to resemble the exterior surface of a boulder. The inner surface of the shell defines a cavity. A plurality of spaced apart anchor tabs are coupled to the bottom portion of the shell. Each anchor tab has a hole for extending a stake therethrough to secure the shell to a ground surface.

12 Claims, 3 Drawing Sheets

ARTIFICIAL BOULDER

BACKGROUND OF THE INVENTION

1. Field of the Invention

The present invention relates to artificial rocks and boulders and more particularly pertains to a new artificial boulder for easy placement and easy portability.

2. Description of the Prior Art

The use of artificial rocks and boulders is known in the prior art. More specifically, artificial rocks and boulders heretofore devised and utilized are known to consist basically of familiar, expected and obvious structural configurations, notwithstanding the myriad of designs encompassed by the crowded prior art which have been developed for the fulfillment of countless objectives and requirements.

Known prior art artificial rocks and boulders include U.S. Pat. Nos. 4,385,088; 3,192,063; 4,960,622; 2,513,648; 5,435,949; PCT Patent No. WO 81/01107 (inventors: Skone et al.); and PCT Patent No. WO 95/30058 (inventor: Scheiwiller).

While these devices fulfill their respective, particular objectives and requirements, the aforementioned patents do not disclose a new artificial boulder. The inventive device includes a shell having a top portion, a bottom portion, an exterior surface, an inner surface. The exterior surface of the shell is designed formed to resemble the exterior surface of a boulder. The inner surface of the shell defines a cavity. A plurality of spaced apart anchor tabs are coupled to the bottom portion of the shell. Each anchor tab has a hole for extending a stake therethrough to secure the shell to a ground surface.

In these respects, the artificial boulder according to the present invention substantially departs from the conventional concepts and designs of the prior art, and in so doing provides an apparatus primarily developed for the purpose of easy placement and easy portability.

SUMMARY OF THE INVENTION

In view of the foregoing disadvantages inherent in the known types of artificial rocks and boulders now present in the prior art, the present invention provides a new artificial boulder construction wherein the same can be utilized for easy placement and easy portability.

The general purpose of the present invention, which will be described subsequently in greater detail, is to provide a new artificial boulder apparatus and method which has many of the advantages of the artificial rocks and boulders mentioned heretofore and many novel features that result in a new artificial boulder which is not anticipated, rendered obvious, suggested, or even implied by any of the prior art artificial rocks and boulders, either alone or in any combination thereof.

To attain this, the present invention generally comprises a shell having a top portion, a bottom portion, an exterior surface, an inner surface. The exterior surface of the shell is designed formed to resemble the exterior surface of a boulder. The inner surface of the shell defines a cavity. A plurality of spaced apart anchor tabs are coupled to the bottom portion of the shell. Each anchor tab has a hole for extending a stake therethrough to secure the shell to a ground surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new artificial boulder apparatus and method which has many of the advantages of the artificial rocks and boulders mentioned heretofore and many novel features that result in a new artificial boulder which is not anticipated, rendered obvious, suggested, or even implied by any of the prior art artificial rocks and boulders, either alone or in any combination thereof.

It is another object of the present invention to provide a new artificial boulder which may be easily and efficiently manufactured and marketed.

It is a further object of the present invention to provide a new artificial boulder which is of a durable and reliable construction.

An even further object of the present invention is to provide a new artificial boulder which is susceptible of a low cost of manufacture with regard to both materials and labor, and which accordingly is then susceptible of low prices of sale to the consuming public, thereby making such artificial boulder economically available to the buying public.

Still yet another object of the present invention is to provide a new artificial boulder which provides in the apparatuses and methods of the prior art some of the advantages thereof, while simultaneously overcoming some of the disadvantages normally associated therewith.

Still another object of the present invention is to provide a new artificial boulder for easy placement and easy portability.

Yet another object of the present invention is to provide a new artificial boulder which includes a shell having a top portion, a bottom portion, an exterior surface, an inner surface. The exterior surface of the shell is designed formed to resemble the exterior surface of a boulder. The inner surface of the shell defines a cavity. A plurality of spaced apart anchor tabs are coupled to the bottom portion of the shell. Each anchor tab has a hole for extending a stake therethrough to secure the shell to a ground surface.

Still yet another object of the present invention is to provide a new artificial boulder that may be stackable with others for convenient storage.

Even still another object of the present invention is to provide a new artificial boulder that may be used during landscaping to simulate rocks and boulders.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
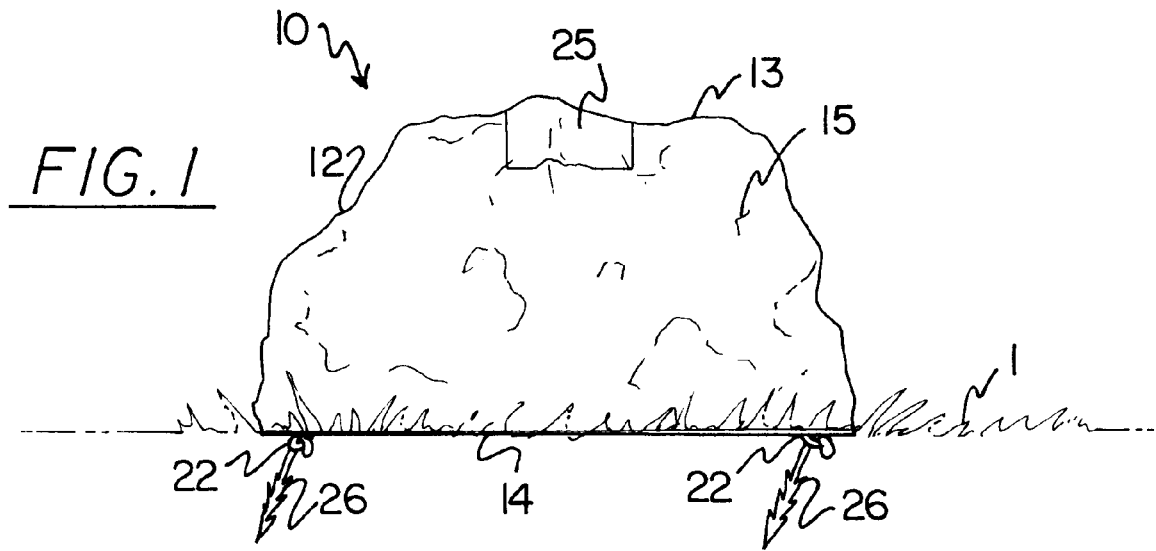
FIG. 1 is a schematic side view of a new artificial boulder according to the present invention.

With reference now to the drawings, and in particular to FIGS. 1 through 8 thereof, a new artificial boulder embodying the principles and concepts of the present invention and generally designated by the reference numeral 10 will be described.

As best illustrated in FIGS. 1 through 8, the artificial boulder 10 generally comprises a shell 12 having a top portion 13, a bottom portion 14, an exterior surface 15, an inner surface 16. The exterior surface 15 of the shell 12 is designed formed to resemble the exterior surface of a boulder. The inner surface 16 of the shell 12 defines a cavity 17. A plurality of spaced apart anchor tabs 22 are coupled to the bottom portion 14 of the shell 12. Each anchor tab has a hole 23 for extending a stake 26 therethrough to secure the shell 12 to a ground surface 1.

Figure 2:
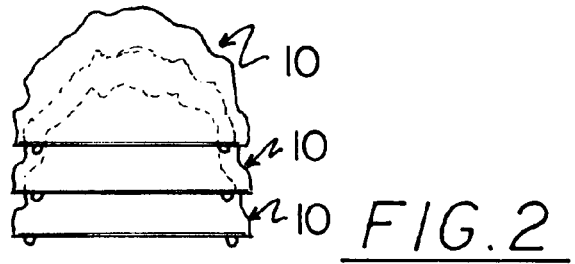
FIG. 2 is a schematic side view of the present invention stacked with other artificial boulders.
Figure 5:
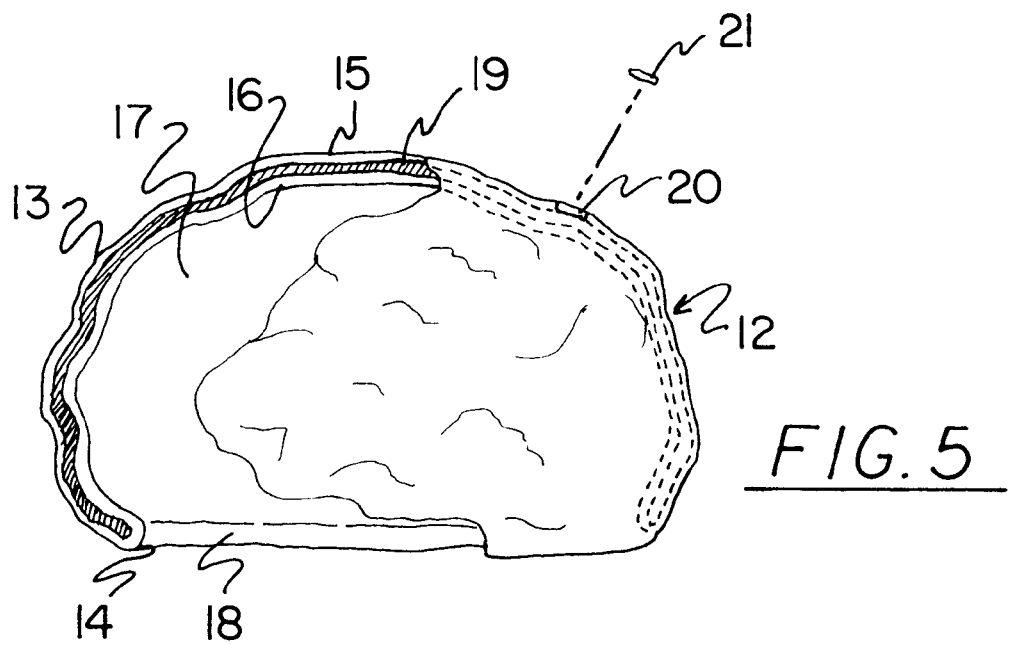
FIG. 5 is a schematic partial breakaway view of another embodiment of the present invention.
Figure 6:
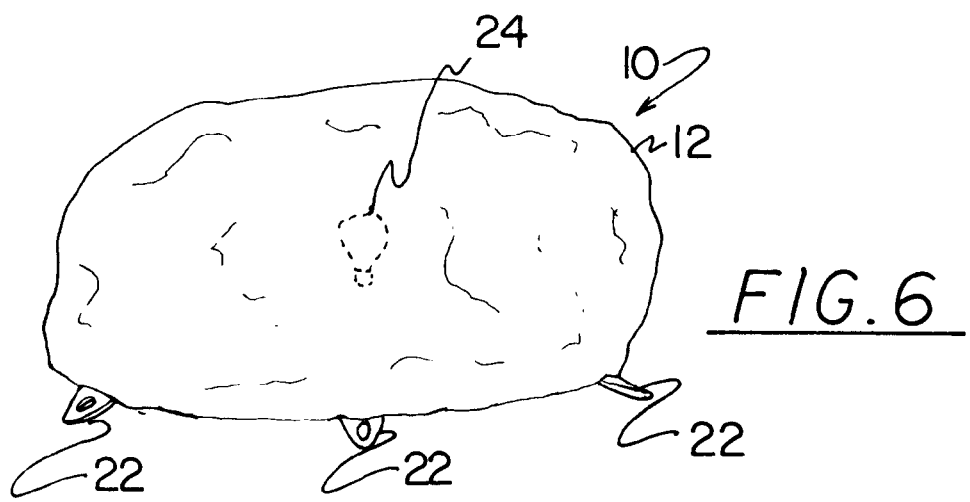
FIG. 6 is a schematic side view of the present invention with a light source provided in the cavity of the shell.
Figure 7:
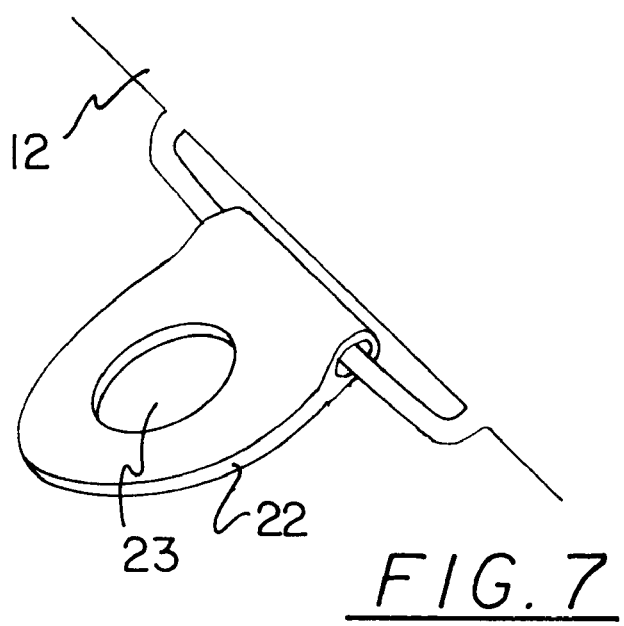
FIG. 7 is a schematic partial perspective view of a anchor tab of the present invention.

In use, the artificial boulder 10 is designed for simulating a natural boulder especially for use in landscaping so that a user can easily create a rocky landscape environment. Specifically, the shell 12 has a top portion 13, a bottom portion 14, an exterior surface 15, an inner surface 16, and an interior between the exterior and inner surfaces 15,16 of the shell 12. The exterior surface 15 of the shell 12 is formed to resemble the exterior surface of a boulder. The inner surface 16 of the shell 12 defines a cavity 17. Optionally, a light source 28 may be provided in the cavity. The bottom portion 14 is preferably generally flat and has an outer perimeter. The bottom portion 14 of the shell 12 is designed for resting on a ground surface 1. As illustrated in FIGS. 2 and 5, in one embodiment of the invention, the bottom portion 14 of the shell 12 has an opening 18 into the cavity 17. Preferably, the periphery of the opening 18 extends along the outer perimeter of the bottom of the shell 12. As shown in FIG. 2, this size of opening is sufficiently large enough to permit insertion of the top of another artificial boulder into the cavity 17 for allowing stacking of the artificial boulders for convenient storage.

Figure 4:
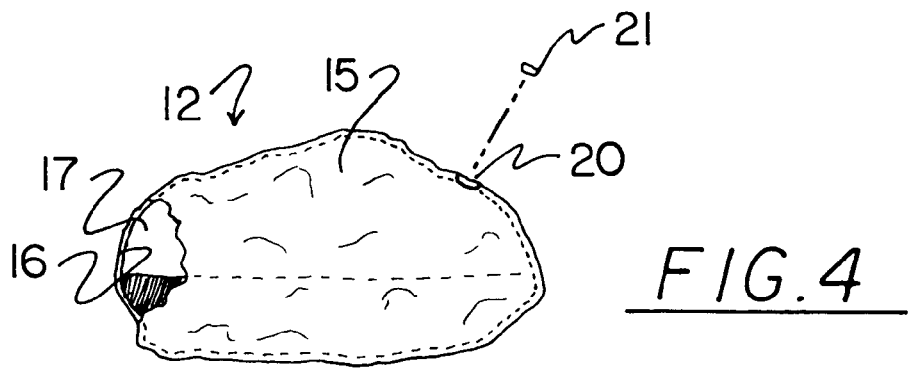
FIG. 4 is a schematic partial breakaway view of an embodiment of the present invention.

As illustrated in FIG. 4, the shell 12 has an aperture 20 therethrough into the cavity 17. The aperture 20 of the shell 12 is designed for permitting filling of the cavity 17 with ballast such as sand or water. With reference to FIG. 5, in another preferred embodiment, the interior of the shell 12 may have a space 19 therein. The space 19 preferably extends from the top of the shell 12 to the outer perimeter of the bottom portion 14 of the shell 12. In this embodiment, the shell 12 has an aperture 27 into the space 19 of the interior of the shell 12. The aperture 27 of the shell 12 is designed for permitting filling of the space 19 of the interior of the shell 12 with ballast such as sand or water. In either embodiment, a removable cap 21 is provided for substantially closing the aperture.

Figure 3:
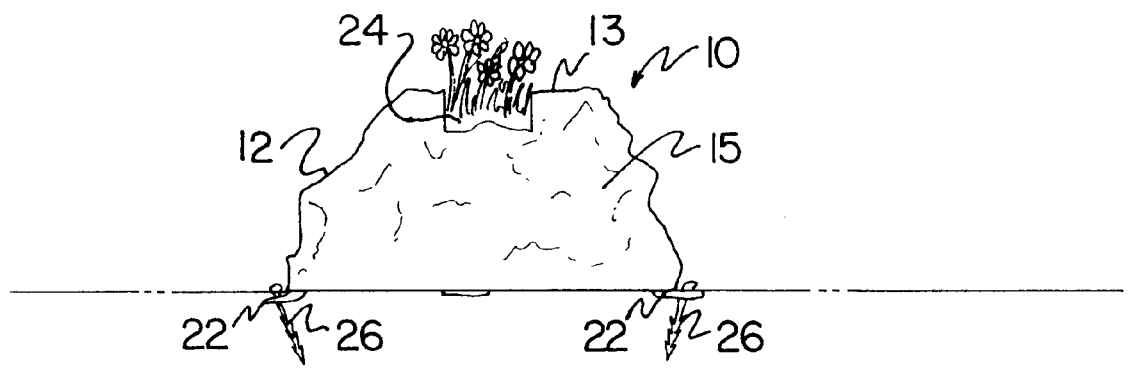
FIG. 3 is a schematic side view of the present invention illustrating a use of the compartment.
Figure 8:
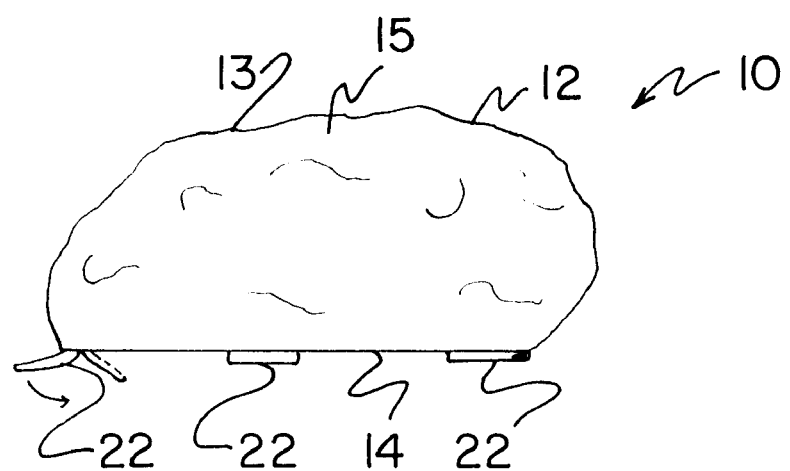
FIG. 8 is a schematic side view of the present invention illustrating the pivoting of an anchor tab.

The invention also includes a plurality of spaced apart anchor tabs 22 coupled to the bottom portion 14 of the shell 12. Each anchor tab has a hole 23 for extending a stake 26 therethrough to secure the shell 12 to a ground surface 1. As shown in FIGS. 1 and 3, each stake preferably has a plurality of barbs for helping hold the stake in the ground. The anchor tabs 22 are preferably positioned adjacent the outer perimeter of the bottom portion 14 of the shell 12. Ideally, the anchor tabs 22 are pivotably coupled to the bottom portion 14 of the shell 12 (FIG. 7) such that each of the anchor tabs 22 is pivotable from a first position extending outwards from the outer perimeter of the bottom portion 14 of the shell 12 and a second position extending inwards from the outer perimeter of the bottom portion 14 of the shell 12 (as illustrated in FIG. 8).

Optionally, the exterior surface 15 of the shell 12 may have a compartment 24 extending into the interior of the shell 12. The compartment 24 is located on the top portion 13 of the shell 12 and is designed for holding items such as a flower bed therein. The exterior surface 15 of the shell 12 preferably includes a detachable lid 25 for substantially covering the compartment 24. The lid 25 is designed formed to resemble a portion of a boulder.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An artificial boulder comprising:

a shell having a top portion, a bottom portion, an exterior surface, an inner surface said inner surface of said shell defining a cavity, said shell having an aperture therethrough into said cavity, said aperture of said shell being for permitting filling of said cavity with ballast, a removable cap substantially closing said aperture of said shell;

said exterior surface of said shell being formed to resemble the exterior surface of a boulder; and a plurality of spaced apart anchor tabs being coupled to said bottom portion of said shell, each anchor tab having a hole for extending a stake therethrough to secure said shell to a ground surface.

2. The artificial boulder of claim 1, wherein said bottom portion is generally flat and has an outer perimeter, and wherein said bottom portion of said shell has an opening into said cavity.

3. The artificial boulder of claim 2, wherein said shell has an interior between said exterior and inner surfaces of said shell, wherein said interior of said shell has a space therein, and wherein said shell has an aperture into said space of said interior of said shell, said aperture of said shell being for permitting filling of said space of said interior of said shell with ballast.

4. The artificial boulder of claim 3, wherein said space is extended from said top of said shell to said outer perimeter of said bottom portion of said shell.

5. The artificial boulder of claim 2, wherein said anchor tabs are positioned adjacent said outer perimeter of said bottom portion of said shell.

6. The artificial boulder of claim 5, wherein said anchor tabs are pivotably coupled to said bottom portion of said shell such that each of said anchor tabs is pivotable from a first position extending outwards from said outer perimeter of said bottom portion of said shell and a second position extending inwards from said outer perimeter of said bottom portion of said shell.

7. The artificial boulder of claim 1, wherein said exterior surface of said shell has a compartment therein, said compartment being located on said top portion of said shell.

8. The artificial boulder of claim 7, wherein said exterior surface of said shell has a detachable lid for substantially covering said compartment, said lid being formed to resemble a portion of a boulder.

9. An artificial boulder comprising:

a shell having a top portion, a bottom portion, an exterior surface, an inner surface, and an interior between said exterior and inner surfaces of said shell;

said exterior surface of said shell being formed to resemble the exterior surface of a boulder;

said inner surface of said shell defining a cavity;

said bottom portion being generally flat and having an outer perimeter, said bottom portion of said shell being for resting on a ground surface;

said interior of said shell having a space therein, said space being extended from said top of said shell to said outer perimeter of said bottom portion of said shell;

said shell having an aperture into said space of said interior of said shell, said aperture of said shell being for permitting filling of said space of said interior of said shell with ballast;

a removable cap substantially closing said aperture of said shell;

a plurality of spaced apart anchor tabs being coupled to said bottom portion of said shell, each anchor tab having a hole for extending a stake therethrough to secure said shell to a ground surface;

said anchor tabs being positioned adjacent said outer perimeter of said bottom portion of said shell;

said anchor tabs being pivotably coupled to said bottom portion of said shell such that each of said anchor tabs is pivotable from a first position extending outwards from said outer perimeter of said bottom portion of said shell and a second position extending inwards from said outer perimeter of said bottom portion of said shell; and said exterior surface of said shell having a compartment extending into said interior of said shell, said compartment being located on said top portion of said shell, said exterior surface of said shell having a detachable lid for substantially covering said compartment, said lid being formed to resemble a portion of a boulder.

10. An artificial boulder comprising:

a shell having a top portion, a bottom portion, an exterior surface, an inner surface;

said exterior surface of said shell being formed to resemble the exterior surface of a boulder;

said inner surface of said shell defining a cavity;

said bottom portion is generally flat and has an outer perimeter, and wherein said bottom portion of said shell has an opening into said cavity;

said shell having an interior between said exterior and inner surfaces of said shell, wherein said interior of said shell has a space therein, and wherein said shell has an aperture into said space of said interior of said shell, said aperture of said shell being for permitting filling of said space of said interior of said shell with ballast; and a plurality of spaced apart anchor tabs being coupled to said bottom portion of said shell, each anchor tab having a hole for extending a stake therethrough to secure said shell to a ground surface.

11. An artificial boulder comprising:

a shell having a top portion, a bottom portion, an exterior surface, an inner surface;

said exterior surface of said shell being formed to resemble the exterior surface of a boulder;

said inner surface of said shell defining a cavity;

said bottom portion is generally flat and has an outer perimeter, and wherein said bottom portion of said shell has an opening into said cavity;

a plurality of spaced apart anchor tabs being coupled to said bottom portion of said shell, each anchor tab having a hole for extending a stake therethrough to secure said shell to a ground surface; and said anchor tabs being positioned adjacent said outer perimeter of said bottom portion of said shell, wherein said anchor tabs are pivotably coupled to said bottom portion of said shell such that each of said anchor tabs is pivotable from a first position extending outwards from said outer perimeter of said bottom portion of said shell and a second position extending inwards from said outer perimeter of said bottom portion of said shell.

12. An artificial boulder comprising:

a shell having a top portion, a bottom portion, an exterior surface, and an inner surface;

said exterior surface of said shell being formed to resemble the exterior surface of a boulder, said exterior surface of said shell has a compartment therein, said compartment being located on said top portion of said shell, wherein said exterior surface of said shell has a detachable lid for substantially covering said compartment, said lid being formed to resemble a portion of a boulder;

said inner surface of said shell defining a cavity; and a plurality of spaced apart anchor tabs being coupled to said bottom portion of said shell, each anchor tab having a hole for extending a stake therethrough to secure said shell to a ground surface.

* * * * *